(12) United States Patent
Cleaves et al.

(10) Patent No.: US 7,949,599 B1
(45) Date of Patent: May 24, 2011

(54) SYSTEM AND METHOD FOR PROVIDING WORKUP TRADING

(75) Inventors: Daniel Cleaves, Summit, NJ (US); Atul Bhatia, Bridgewater, NJ (US)

(73) Assignee: ICAP Services North America LLC, Jersey City, NJ (US)

( * ) Notice: Subject to any disclaimer, the term of this patent is extended or adjusted under 35 U.S.C. 154(b) by 0 days.

(21) Appl. No.: 12/900,010

(22) Filed: Oct. 7, 2010

Related U.S. Application Data (63) Continuation of application No. 12/166,083, filed on Jul. 1, 2008, now Pat. No. 7,831,504.

(51) Int. Cl.
*G06F 40/00* (2006.01)

(52) U.S. Cl. .......................................... 705/37; 705/35

(58) Field of Classification Search ................ 705/1–50; 709/36, 201, 208; 333/139
See application file for complete search history.

(56) References Cited

U.S. PATENT DOCUMENTS

| | | | |
|---|---|---|---|
| 5,905,974 A | 5/1999 | Fraser et al. | |
| 6,560,580 B1 | 5/2003 | Fraser et al. | |
| 7,379,898 B2 | 5/2008 | Tenorio | |
| 7,383,220 B1 * | 6/2008 | Keith | 705/37 |
| 7,698,208 B2 | 4/2010 | Hirani et al. | |
| 2002/0091617 A1 | 7/2002 | Keith | |
| 2004/0034591 A1 | 2/2004 | Waelbroeck et al. | |
| 2004/0210512 A1 | 10/2004 | Fraser et al. | |
| 2005/0055304 A1 | 3/2005 | Lutnick et al. | |
| 2005/0091142 A1 | 4/2005 | Renton et al. | |
| 2005/0160032 A1 | 7/2005 | Lutnick et al. | |

FOREIGN PATENT DOCUMENTS

| | | |
|---|---|---|
| EP | 1256895 | 11/2002 |
| WO | WO-98/26363 A1 | 6/1998 |
| WO | WO-00/38093 | 6/2000 |
| WO | WO-2007/082219 | 7/2007 |

OTHER PUBLICATIONS

Jian Yao, Market Making in the Interbank Foreign Exchange Market, Nov. 15, 1996, JP Morgan Chase, web, 1-5.

* cited by examiner

*Primary Examiner* — Mary Cheung
*Assistant Examiner* — Marissa Liu
(74) *Attorney, Agent, or Firm* — Dickstein Shapiro LLP

(57) ABSTRACT

A trading system matches a passive order to buy or sell an item at a price with an aggressive order to hit or lift the item at that price. A workup is initiated during which other parties can submit additional orders at the passive order price. A further order may be submitted during workup with a better price. If the amount at the better price equals or exceeds a threshold value and it can be traded at the better price, the workup is terminated and a new workup initiated at the better price.

8 Claims, 5 Drawing Sheets

WORKUP AT 100.21

| BIDS | PRICE | OFFERS |
|---|---|---|
| | 100.23 | 50 |
| | 100.22+ | 153 |
| | 100.22 | 58 |
| | 100.21+ | 15 |
| 50 | 100.21 | 0 (T) |
| 150 | 100.20+ | |
| 17 | 100.20 | |
| 25 | 100.19+ | |

USER ATTEMPTS TAKE OF 15 AT 100.21+

WORKUP AT 100.21+

| BIDS | PRICE | OFFERS |
|---|---|---|
| | 100.23 | 50 |
| | 100.22+ | 153 |
| | 100.22 | 58 |
| 0 | 100.21+ | 0 (T) |
| 50 | 100.21 | |
| 150 | 100.20+ | |
| 17 | 100.20 | |
| 25 | 100.19+ | |

FIG. 1

WORKUP AT 100.21

| BIDS | PRICE | OFFERS |
|---|---|---|
|  | 100.23 | 50 |
|  | 100.22+ | 153 |
|  | 100.22 | 58 |
|  | 100.21+ | 15 |
| 50 | 100.21 | 0 (T) |
| 150 | 100.20+ |  |
| 17 | 100.20 |  |
| 25 | 100.19+ |  |

USER ATTEMPTS TAKE OF 15 AT 100.21+

WORKUP AT 100.21

| BIDS | PRICE | OFFERS |
|---|---|---|
|  | 100.23 | 50 |
|  | 100.22+ | 153 |
|  | 100.22 | 58 |
|  | 100.21+ | 15 |
| 65 | 100.21 | 0 (T) |
| 150 | 100.20+ |  |
| 17 | 100.20 |  |
| 25 | 100.19+ |  |

*FIG. 2*
PRIOR ART

WORKUP AT 100.21

| BIDS | PRICE | OFFERS |
|---|---|---|
|  | 100.23 | 50 |
|  | 100.22+ | 153 |
|  | 100.22 | 58 |
|  | 100.21+ | 15 |
| 50 | 100.21 | 0 (T) |
| 150 | 100.20+ |  |
| 17 | 100.20 |  |
| 25 | 100.19+ |  |

USER ATTEMPTS TAKE OF 15 AT 100.21+

WORKUP AT 100.21+

| BIDS | PRICE | OFFERS |
|---|---|---|
|  | 100.23 | 50 |
|  | 100.22+ | 153 |
|  | 100.22 | 58 |
| 0 | 100.21+ | 0 (T) |
| 50 | 100.21 |  |
| 150 | 100.20+ |  |
| 17 | 100.20 |  |
| 25 | 100.19+ |  |

*FIG. 3*

10_YEAR

| BIDS | PRICE | OFFERS |
|---|---|---|
|  | 100.21+ | 15 |
| 50 | 100.21 | 0 |
| 150 | 100.20+ |  |

*FIG. 4*

10_YEAR

| BIDS | PRICE | OFFERS |
|---|---|---|
|  | 100.21+ | 15 |
| 50 | 100.21 | 0 |
| 10 | 100.20+ |  |

*FIG. 5*

10_YEAR

| BIDS | PRICE | OFFERS |
|---|---|---|
|  | 100.21+ | 15 |
| 50 | 100.21 | 0 |
| 30 (TRADER T1) 20 (TRADER S1) | 100.20+ |  |

*FIG. 6*

10_YEAR

| BIDS | PRICE | OFFERS |
|---|---|---|
|  | 100.21+ | 15 |
| 50 | 100.21 | 0 |
| 5 (30 HIDDEN) | 100.20+ |  |

*FIG. 7*

10_YEAR

| BIDS | PRICE | OFFERS |
|---|---|---|
|  | 100.21+ | 50 |
| 50 | 100.21 | 30 |
|  | 100.20+ |  |

FIG. 8A

10_YEAR

| BIDS | PRICE | OFFERS |
|---|---|---|
|  | 100.21+ | 50 |
| 20 | 100.21 | 0 |
|  |  | 30 (NOT PART OF WORKUP) |
|  | 100.20+ |  |

FIG. 8B

10_YEAR

| BIDS | PRICE | OFFERS |
|---|---|---|
|  | 100.22 | 20 |
|  | 100.21+ | 15 |
| 50 | 100.21 | 0 |
| 150 | 100.20+ |  |

SYSTEM AND METHOD FOR PROVIDING WORKUP TRADING

CROSS REFERENCE TO RELATED APPLICATION

This is a continuation of application Ser. No. 12/166,083, filed Jul. 1, 2008, which is hereby incorporated herein by reference.

FIELD OF THE INVENTION

This invention relates to trading systems and methods and, in particular, to systems and methods in which passive orders entered into a system are matched with aggressive orders submitted in response to passive orders, and to workup trades which are available for a limited time after a match has been made between an aggressive and a passive order.

BACKGROUND OF THE INVENTION

In many markets, buy and sell orders at the same price are automatically matched. Thus, for example, a first order to buy an item at a price of 100 and a second order to sell the same item at a price of 100 will, in such markets, result in a transaction in which some quantity of the item is sold at the specified price. However, in some markets, for example, the secondary market for US Government treasuries, orders of equal price are not automatically matched. Rather, certain types of buy and sell orders, called "passive" orders, may co-exist at the same price without triggering a transaction. These passive orders do not trade unless "aggressed" against by a trader submitting a second type of order, called an "aggressive" order. Historically, a passive order to buy has been referred to as a "bid", while a passive order to sell has been referred to as an "offer". By contrast, an aggressive order to sell has been referred to as a "hit", while an aggressive order to buy has been referred to as a "take" or "lift" depending on the market.

This distinction between passive and aggressive orders is one of several characteristics of the secondary market in US Government treasuries and other markets that has developed to encourage market liquidity. In particular, since it is impossible to generate liquidity in a market without having someone first make a price, inter-dealer brokers historically sought to encourage traders to submit bids and offers by not charging them a commission if their orders resulted in a trade. Thus, passive bids and offers could not be matched even at the same price since neither the passive buyer not the passive seller would be required to pay a commission and the inter-dealer broker would not execute a transaction without a commission being paid.

In addition to commission-free-trades, inter-dealer brokers in the secondary market for US Government treasuries and other markets also rewarded buyers and sellers by developing a number of trading protocols or conventions which granted certain buyers and sellers certain trading option or "rights". One such convention is commonly referred to as "workup". In general terms, this convention permits buyers and sellers to "work up" the size of a trade from the quantity traded as a result of an initial "hit" or "lift". Historically, certain traders, including the first aggressive-side and passive-side traders, were granted an option or right to increase their size, and to trade that additional size ahead of other traders.

Conceptually, a workup is considered a single deal extended in time. This conception was reflected historically in several interesting aspects of workup trading. For example, because all trading during workup was considered part of a single deal, all such trading occurred at a single price point set by the initial hit or lift that triggered the workup. In addition, the initial aggressor's side of the market (i.e., the sell side in the case of a hit and the buy side in the case of a lift) was designated the "aggressive" side of the market for the duration of the workup. Similarly, the opposite side of the market was designated the "passive" side of the market for the entire workup. This designation played an important role in trading, including determining which entities would pay commission, historically paid only by the aggressive side of the market.

As electronic trading developed, electronic platforms were developed that provided for automated workup functionality. One such electronic platform is the BrokerTec® electronic trading platform operated by ICAP Electronic Broking which first included a workup functionality in May 2001. As originally launched, the BrokerTec® workup functionality included two distinct phases, a private phase and a public phase. During the private phase, an aggressor that bought or sold all displayed volume at the best available price was granted an exclusive right to trade additional volume for the duration of the private phase. If the aggressor failed to buy or sell all displayed volume at the best available price, no exclusive trading privileges were granted on the aggressive side of the market, and all traders on that side of the market traded on a first-come-first-served basis even during the private phase. On the passive side of the market, the first position bidder or offerer that was hit or lifted was granted exclusive trading privileges for the duration of the private phase.

The private phase in the BrokerTec electronic trading platform automatically expired after a fixed, non-extendable number of seconds tracked by a timer. Upon expiration of the private phase, the public phase commenced. During the public phase, all trading on both sides of the market was conducted on a first-come-first-served basis. The duration of the public phase was also controlled by a timer. But unlike the private-phase timer, the public-phase timer was reset each time a new execution occurred during the workup. Thus, expiration of the public-phase timer indicated a sustained period of trading inactivity and caused the system to end the workup.

The BrokerTec electronic trading platform includes four types of aggressive orders: fill or kill (FoK), fill and store (FaS), fill and kill (FaK) and fill and kill immediate (FaKi): Generally speaking, a FoK order is executed only if it can be completely filled. Thus, for example, if a trader submits a FoK order to buy 10 mm of a particular security at par and only 8 mm of that security is available at that price, no trade occurs and the order is "killed" i.e., not entered in the order book.

By contrast, FaK, FaKi and FaS orders may be partially filled. When a FaS order is partially filled, the unfilled portion of the order is automatically converted to a new order for the unfilled size on what is called the "follow," i.e., the period following completion of the trade. Thus, if a trader submits a FaS order to buy 10 mm of a particular security at par and only 8 mm of that security is available at that price, 8 mm of the order is filled, and the unfilled portion of the order is converted into a new passive order to buy 2 mm of the specified security at par at the end of workup.

When a FaK order is partially filled, the unfilled portion of the order is "killed" and does not result in an order for the unfilled size on the follow. Thus, if a trader submits a FaK order to buy 10 mm of a particular security at par and only 8 mm of that security is available at the price, 8 mm of the order is filled, and the order's unfilled portion is "killed" at the end of the workup. FaKi orders are traded to the maximum extent possible at the time of entry and the rest is cancelled immediately. By contrast, any portion of a FaK order that cannot be immediately traded when entered is stored and may be traded during the duration of a workup and any size remaining at the end of the workup is killed. FaKi orders may only be submitted by automated or algorithmic trading terminals.

More recently, the BrokerTec system has been modified to incorporate a variation of workup which has no private phase but two public phases, one occurring after the other. This protocol is described in commonly assigned co-pending application U.S. Ser. No. 11/475,975, the contents of which are incorporated herein by reference in their entirety for all purposes including without limitation with respect to the trading rules applied during workup. This variation of workup is known as double public as it consists of two public phases.

In the double public protocol, a first workup period commences when a trade between two parties is executed. In contrast to the previous private workup, this workup period is open to any trader on the system, in addition to the parties that commenced the workup, to submit additional orders for the item transacted. These additional orders are transacted at the same price as the original transaction. The first phase of workup lasts either for a predetermined time, typically in the order of 3 or 4 seconds, or until an additional transaction takes place, in which case the protocol moves to a second phase in which any party can still submit additional orders to trade at the same price as the original transaction, which is the price of the original matched passive order. This is again a public workup, but on commencement, a timer is started and, after a predetermined period, typically shorter than the first workup period, the timer expires and the workup finishes. However, in contrast to the first workup period, the timer is reset every time an additional trade is executed. In this way, the workup lasts as long as there is interest in the market to conduct trades at the price of the original matched transaction. But the workup ends when that interest ends, so allowing the market to move to the next price point without delay.

It will be appreciated that the double public workup does not provide any trader exclusive privileges to the parties to the original transaction. The original rationale for providing these privileges was to encourage market making that is the submission of passive orders into the market to provide liquidity. It has been found that this encouragement is not equally important in all markets. This is particularly true in markets where a significant amount of trading activity is conducted by algorithmic traders. Algorithmic traders are computers that act as automated trading interfaces which make trading decisions and execute orders on the basis of a trading algorithm which responds in a predetermined manner to changes in market conditions. Algorithmic traders will submit orders, either passively or aggressively in response to their programming and do not need the encouragement provided by private workup.

The secondary market in US Government treasuries is a good example of a market in which algorithmic traders are very active. We have appreciated that it is desirable to improve the double public workup protocol as, in its original form it is not capable of reacting rapidly enough to meet the demands of algorithmic traders in particular when the market is unwilling to transact further at the price point of the transaction that triggered the workup.

This need arises largely due to the speed at which algorithmic traders react. As they are computers, algorithmic traders react near instantaneously to changing market data; much quicker than traditional human traders. Accordingly, if algorithmic traders do not want to transact workup trades, the fixed phase of the first public workup period is a comparatively long time for them to wait until they can submit further orders. From the point of view of the system operator, this is a period during which potential deals are lost, and so potential revenue through commission is lost.

SUMMARY OF THE INVENTION

The invention aims to improve the existing public workup protocol to add additional functionality while maintaining the advantages of traditional workup. In its broadest aspect it provides a system and method in which an order can be traded during workup at a price better than the workup price by terminating the existing workup and initiating a new workup at the better price.

The invention is defined by the independent claims to which reference should be made.

A preferred embodiment provides a system and method that allow a faster transaction between price points when workup is in progress. This prevents traders, particularly algorithmic traders, from having to wait for the end of a set workup period, even when there is no further interest at the workup price, to be able to execute trades at a different price. Thus, embodiments of the invention may provide faster price discovery.

Once a workup has commenced, orders specifying a price better than the workup price may be received. If these orders, individually or in aggregation, exceed a threshold amount the existing workup is terminated and a new workup is started at the better price. Orders can then be executed at the better price as part of the new workup.

In one preferred embodiment the new workup may only be initiated if there are sufficient passive orders in the system at the better price to equal or exceed the threshold. Preferably, when considering passive orders with hidden amounts, both the visible and hidden amounts are taken into account when considering whether the threshold has been equalled or exceeded.

In one preferred embodiment, any passive amount remaining at the initial workup price is executed first at that amount. The new workup is initiated for the remaining amount only if, either alone or in aggregation with other orders, it equals or exceeds the threshold.

BRIEF DESCRIPTION OF THE FIGURES

An embodiment of the invention will now be described, by way of example only, and with reference to the accompanying drawings, in which.

DETAILED DESCRIPTION OF PREFERRED EMBODIMENTS OF THE INVENTION

Figure 1:
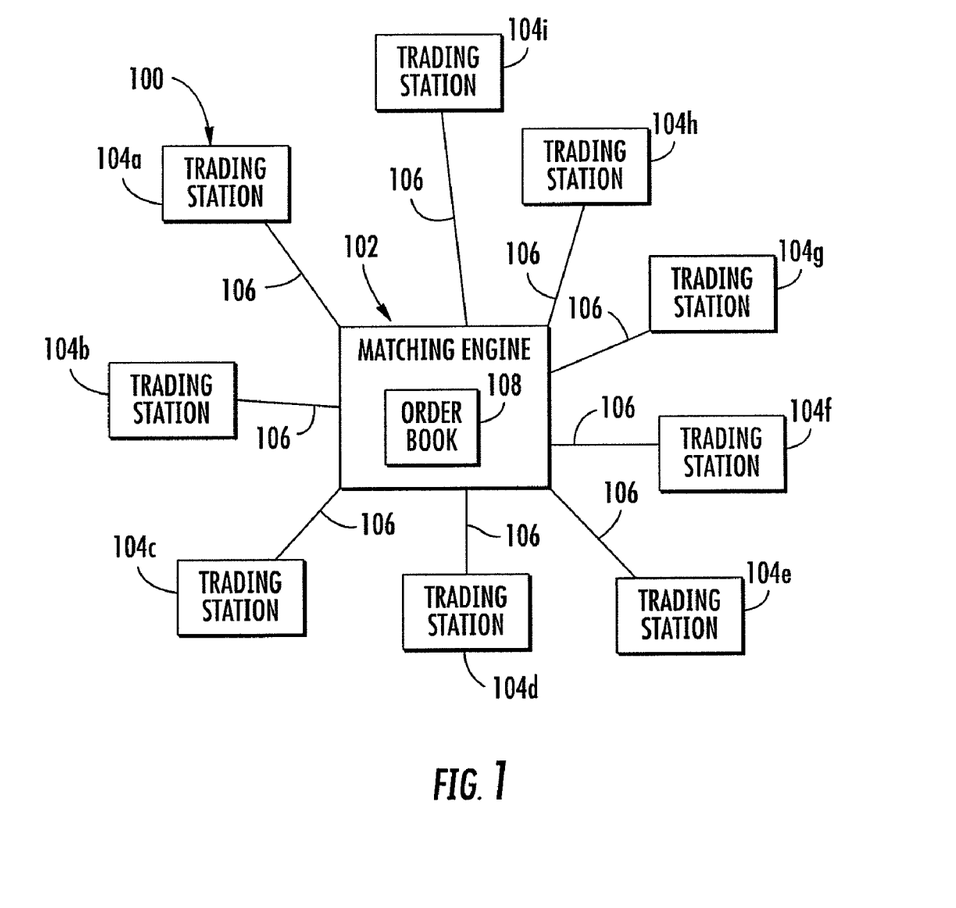
FIG. 1 is a schematic block diagram of an exemplary trading system embodying the invention.

FIG. 1 shows a trading system 100 comprising a matching engine 102 and a plurality of trader terminals 104 connected via appropriate communication links 106. A matching engine 102 is preferably adapted to receive orders to buy and sell tradable items such as securities, commodities or any type of financial instrument from terminals 104, to process trading orders in accordance with specified protocols, and to communicate market information concerning trading activity to terminals 104, as described in more detail below.

Matching engine 102 preferably comprises one or more server computers and associated components programmed to implement the trading activity described below. As further shown in FIG. 1, matching engine 102 maintains an order book 108 that stores orders to buy and sell received by matching engine 102 from terminals 104, as described in more detail below.

Each trader terminal 104 may preferably be a computer workstation comprising a CPU, memory, a display, and input devices, such as a mouse, keyboard, or specialised trading keypad. Such terminals are intended for use by human traders who input orders using the input devices. Alternatively, or additionally, the trader terminals 104 may be computers which run trading algorithms that automatically submit orders to the matching engine in response to market data received from the matching engine and in accordance with programming implementing the trading algorithm. Such trader terminals are also commonly referred to as algo traders. In practice, the trading system will have a large number of trader terminals 104, possibly several hundred, which will be a mix of conventional human trader terminals and also algorithmic trader terminals. Terminals 104 may be provided to customers for direct entry of buy and sell orders on their own behalf, or to brokers for entry of such orders on behalf of others. Communication links 106 may comprise any appropriate arrangement of wired or wireless communication lines or networks, such as the Internet or dedicated communication lines.

Figure 2:
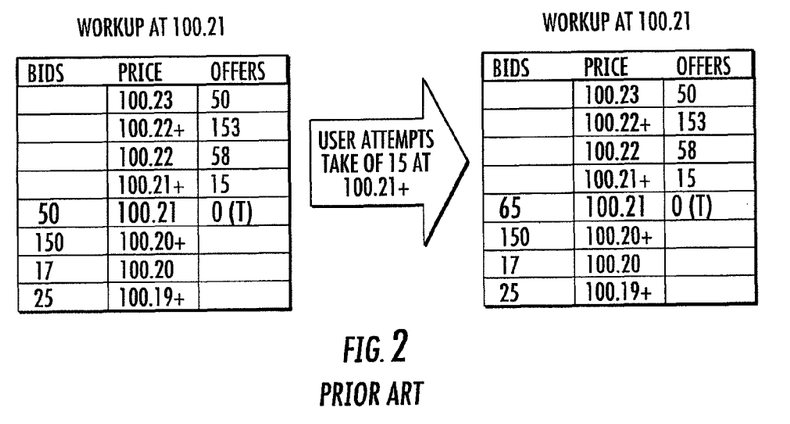
FIG. 2 illustrates the order book during a conventional public workup.

In the existing public workup protocol implemented on the BrokerTec® platform by ICAP Electronic Broking, and as described in U.S. Ser. No. 11/475,975 referred to above, an attempt to trade, during workup, an order at a price better than the price at which the passive order that initiated the workup was traded at, would not be allowed at that better price. Such an order may be converted to the workup price by the matching engine and matched at that price during the current workup. These orders could be partially or fully filled at the existing workup price depending on what trading options the trader has selected, but could not be filled at the better price until the workup has finished. This procedure is shown in FIG. 2 which shows the order book during a traditional public workup. Here, a trade has been executed at 100.21 initiating a workup and the order book shows prices in the market both above and below the workup price, with bids to buy below the workup price shown by a number representing volume available at that price and offers to sell above the workup price also shown as the volume available at that price. The + symbol in the price column represents a half tick or pip, thus, 100.21+ is a price of 100 and 21.5 32nds. In FIG. 2, a trade has been executed at 100.21 to initiate workup. A trader then attempts a take for 15 mm at 100.21+ during workup at 100.21 and, as shown in the right hand panel, the order is converted to the ongoing workup price of 100.21 during current workup.

As the workup consists of a fixed term first phase followed by a re-settable second phase, a trader wishing to trade away from the workup price must wait until at least the fixed term first phase has ended, at which point, workup will end if there have been no further transactions.

Figure 3:
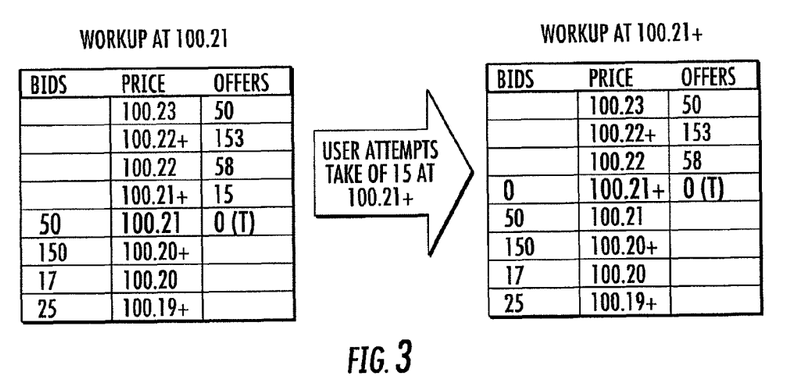
FIG. 3 illustrates the order book implementing an embodiment of the present invention.

FIG. 3 shows an illustration of an enhancement to the workup protocol embodying the invention in which traders are permitted to trade through the workup price by executing orders during the workup at a price that is different from the workup price. In one preferred embodiment such trades are allowable only if the volume to be traded exceeds a predetermined minimum volume. In practice, this minimum volume is defined on a per-instrument basis. A second condition in this preferred embodiment is that there must be volume available for matching at the new price point. This enables a trade to be performed to initiate the new workup. If the condition is satisfied, the existing workup is terminated and a new workup commences at the new price.

FIG. 3 shows a preferred embodiment of how this enhancement may work. In this example, the minimum size required to trade at a different price is 10 mm. The left hand order book is the same as the left hand order book of FIG. 2, and the same attempt is made to take 15 mm at 100.21+ during the workup at 100.21. As the volume of this order exceeds the threshold, the trade is executed for 15 at the new price, the existing workup is terminated and a new workup is commenced at 100.21+.

It is preferred that the new workup is a two phase public workup as described in U.S. Ser. No. 11/475,954. However, it could be a single phase public workup either having a fixed term or being reset if there is a trade during the workup term. Alternatively, it could be a private workup or a combination of private and public workup. Similarly, although described in terms of an initial two phase public workup, the resetting of the workup at a new price may be used with any type of initial workup including public, private or any combination of the two.

FIGS. 4-9 show various examples of the handling of orders received at prices other than the workup price during a workup. For ease of illustration in these examples the orders will be assumed to be FaS orders.

Figure 4:
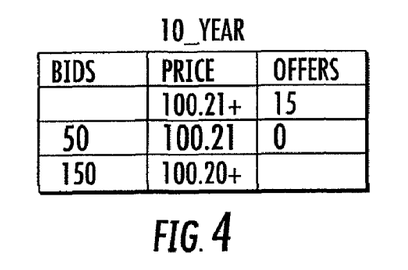
FIG. 4 shows an order book illustrating the aggregation of passive volume.

In FIGS. 4-9, the initial workup is at 100.21 and the minimum threshold for a trade through trade is 25 mm. In FIG. 4, the aggregation of aggressive orders is shown. In the initial trade that commenced the workup the buy side is aggressive and during workup an aggressive sell order for 70 mm at 100.20+ is received. 50 mm of this order can be executed at the existing workup price of 100.21. The remaining 20 mm is below the threshold for a new workup at the better price and so the rest of the order is entered into the book as an aggressive order at the workup price of 100.21.

A second trader now sells 10 mm at 100.20+. The aggregated volume that can trade at the better price is 30 mm which is above the predetermined threshold. The current workup is ended and a new workup started at 100.20+. The first order for 20 mm is traded first followed by the order for 10 mm. Thus, aggressive volume may be aggregated to exceed or match the threshold required to initiate a new workup at a better price. The actual orders at the trade through price are not aggregated. It is merely the volume of those orders to determine whether there is sufficient interest in the market to move to the new price point.

Figure 5:
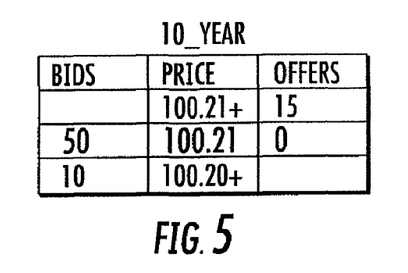
FIG. 5 shows an order book illustrating the aggregation of aggressive volume.

FIG. 5 shows how passive volume may similarly be aggregated. Here the buy side of the original trade that initiated the workup is again aggressive. There is a volume of 50 mm on the buy side at the workup price and a further 10 mm at 100.20+. An order to sell 100 mm at 100.20+ is received. The first 50 mm will be traded at the workup price but the remaining 50 mm cannot be traded as there is only 10 mm in the market at 100.20+ which is below the threshold of 25 mm. The 50 mm is therefore entered as an aggressive order at the workup price of 100.21. A second trader then bids 20 mm at 100.20+ on the buy side. The aggregated volume that can trade at 100.20+ is now 30 mm and above the threshold. The current workup is ended and a new workup established at 100.20+ with the sell side as the aggressive side. The first order for 10 mm will trade first, followed by the order for 20 mm. Thus, in this preferred embodiment there must be a volume of both passive and aggressive orders at the new price that is equal to or greater than the threshold volume for the existing workup to be terminated and a new workup commenced at the new price. In one preferred embodiment the passive and aggressive side thresholds for trade through may be set at the same volume (e.g., 25 mm). Alternatively, different thresholds for the two sides of the market may be set or a threshold may be set for one side of the market only.

Figure 6:
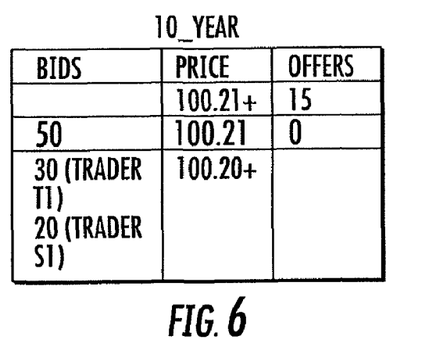
FIG. 6 shows the effect of disallowing internal crossing.

FIG. 6 illustrates how the system handles orders from traders who are not permitted to trade with one another. This may be because internal crossing is not allowed by the system to prohibit traders from the same institution trading with one another, or for some other reason, such as a lack of credit between the parties. There is a volume of 50 mm on the buy side at the workup price of 100.21. Trader T1 has a passive buy order for 30 mm at 100.20+. Trader T2 is from the same institution as trader T1 and cannot trade with him. If trader T2 enters a sell order for 100 mm at 100.20+, 50 mm of that order can be traded at the workup price. However, only 20 mm can be traded at 100.20+ which is insufficient to end the current workup as it does not meet the threshold and so the remaining 50 mm is entered into the book as an aggressive sell order at the workup price for 50 mm.

It will be appreciated in the examples described that where an order has insufficient volume to cause a new workup to be started, it is entered as an aggressive order at the present workup price during the current workup, but is tagged so that it can be recognised as willing to trade at a better price and aggregated with other orders at that better price when they are received.

It is common practice to enter passive orders with hidden amounts. Allowing hidden amounts is a further way of encouraging traders to put liquidity into the market. A trader may wish to show 5 mm to the market but actually wishes to buy or sell a total of 35 mm. The trader is anxious not to disclose the full extent of their interest for fear of adversely affecting the market and so enters the order for 35 mm with 5 mm visible and 30 mm hidden. Only the visible part of the order will be seen by other traders. Ordinarily the hidden amount will gradually be exposed as the visible amount is traded.

Figure 7:
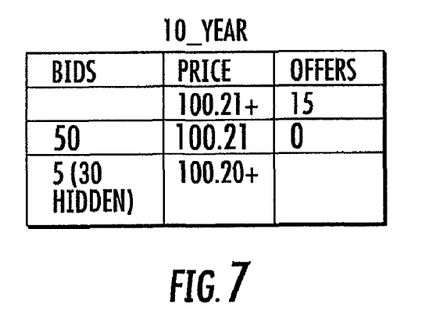
FIG. 7 illustrates how hidden volumes are treated when determining whether to initiate a further workup.

This situation is shown in FIG. 7. Here, there is a volume of 50 mm on the buy side at the workup price and a buy order for 5m with 30 mm hidden at 100.20+. If a sell order for 100 mm at 100.20+ is received, 50 mm will be traded at the workup price and the workup will be terminated and a new workup started at 100.20+ as the combined visible and invisible order for 35 mm is greater than the threshold. Thus, in assessing whether there is sufficient volume at the new price, the system in this preferred embodiment considers both invisible and visible amounts at the new price.

Figure 8A:
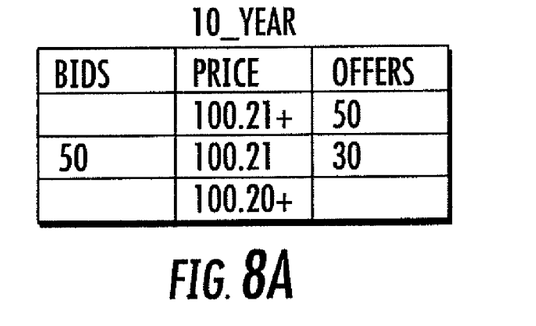
FIG. 8 shows how locked markets may be unlocked.
Figure 8B:
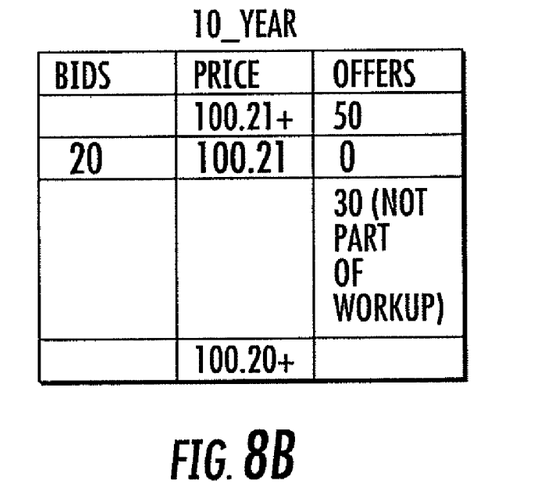

FIG. 8 shows how the system deals with a locked market. In FIG. 8A, there is no workup as passive orders have caused a locked market at 100.21. It should be remembered that passive orders cannot conventionally be matched with each other even if they are at the same price. A sell order is now received as an aggressive order for 30 mm at 100.21 and workup starts at 100.21. In FIG. 8b, a trader enters a buy order for 25 mm at 100.21+. Although there is 30 mm at the workup price this is the original passive offer for 30 mm that existed before the workup and is not included in the workup. Such buy order will stay in the book as an aggressive order at the existing workup price at 100.21, and the trader will not be able to trade at 100.21 or 100.21+.

If the buy order had been for 31 mm then the order would trade 30 mm at 100.21 and a new workup would have started at 100.21+ with 1 mm traded. In this embodiment, in a locked market, in addition to meeting the trade through threshold, there must be sufficient volume in the trade through order to transact the entire original passive sell side volume that was not part of the workup at the workup price and at least 1 mm at the new trade through price. The purpose of this is to prevent a continuous switching of the direction of the workup, at the same price, and to avoid a crossed market, which would be disruptive.

To illustrate this point with another example, if there had been only 20 mm on the offer side at 100.21, the 25 mm buy order would trade 20 mm at 100.21 and a new workup would have started at 100.21+ with 5 mm traded.

Figure 9:
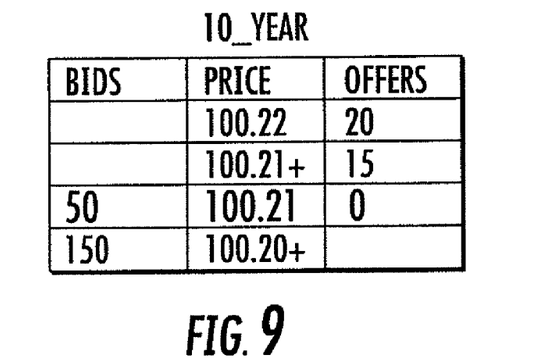
FIG. 9 shows how several levels of workup may be initiated.

FIG. 9 shows how trade through can operate at several trade levels. A buy order for 10 mm at 100.22 is received. It is below the threshold and so the current workup is not ended. If another buy order for 20 mm at 100.22 is received, the aggregated amount of the new price exceeds the threshold and the current workup is ended and a new workup started. However, as there is a passive offer in the market for 15 mm at 100.21+, the first order will match for 10 mm at 100.21+ and the workup will start at 100.21+. The second order will then match for 5 mm at 100.21+ and 15 mm at 100.22. The workup at 100.21+ will end immediately and a new workup starts at 100.22. Thus, in this preferred embodiment, the system aggregates passive volume across price points in determining whether the threshold for commencing a trade through workup is met.

The net result is that workup moves from 100.21 to 100.22 and that 30 mm is traded. However, this progression through the different levels will not be noticeable to the human trader following on their display as the change in levels is near instantaneous. Accordingly, if desired, the system may be programmed to execute the trades described above at 100.21+ without formally establishing a workup at that price.

Orders entered into the system may include FoK (fill or kill), FaS (fill and store), FaK (fill and kill) and FaKi (fill and kill immediate). As discussed above, if a FaK order is not fully filled, the remaining unfilled part of the order is killed at the end of workup whereas a FaKi order is killed immediately to the extent it is not filled when entered. In one preferred embodiment of the invention, FaK orders that are sent in at the current workup price are killed and deleted immediately when workup at the present price ends. Trade through FaK are removed only when all trade through orders have been reset at their original prices if no new workup is started. During the previous workup, if the trade through order is insufficient to move the price point, it is entered into the book at the present workup price and reset at the trade through price when the workup ends. This procedure is repeated every time a workup ends so there is no time limit on a FaK order that is entered during a workup and there is no limit as to the number of price levels such FaK orders can trade through.

However, in one preferred embodiment, the system limits the distance from the current price a trade through order may be placed. This distance is configurable in the system and may vary from instrument to instrument. In the US Government treasuries market, a presently preferred limit is 2 ticks.

The system may also handle trade through FoK orders but in a preferred embodiment, such orders will only be traded if there is sufficient volume at the existing workup price and the trade through price to execute the whole of the order.

Figure 10:
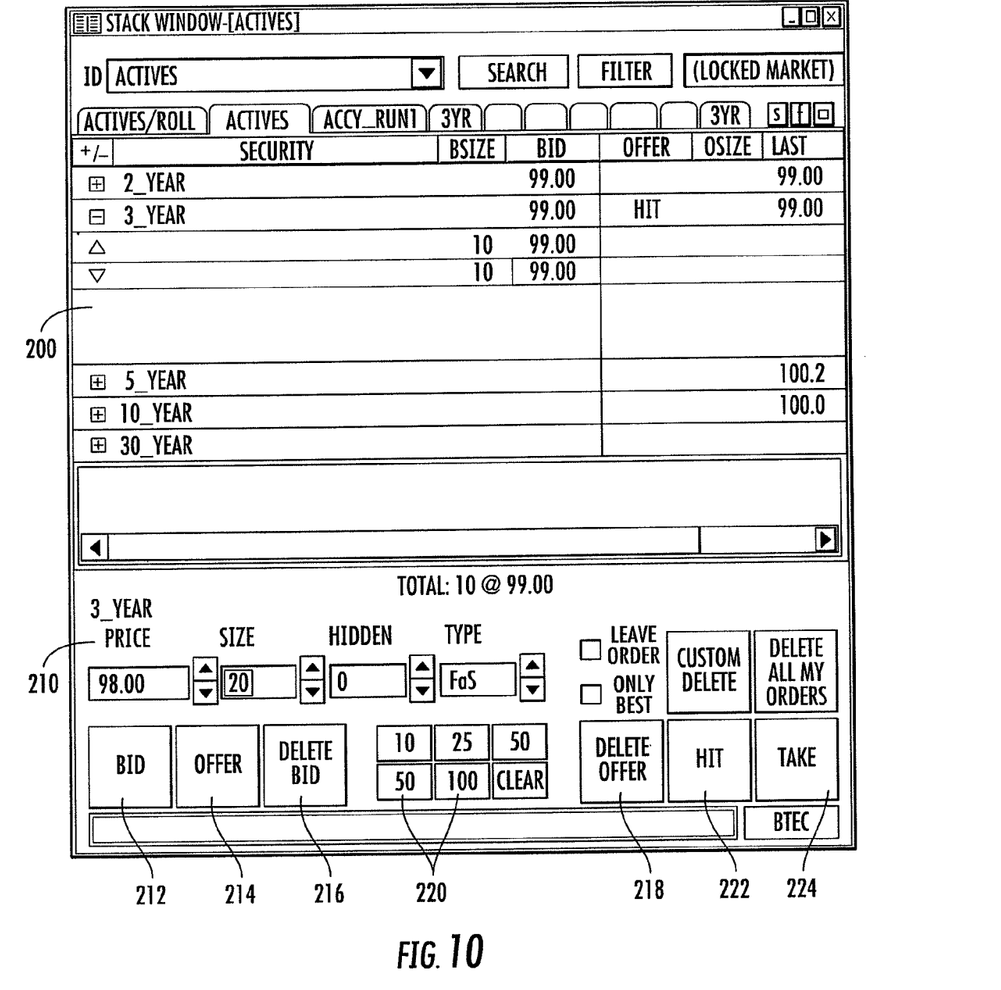
FIG. 10 is a trader terminal input screen for inputting orders in accordance with an embodiment of the invention.

FIG. 10 shows an example of a trader display which may be used by manual traders to see the market and to enter orders into the system. The upper half of the screen, generally designated 200 shows the trader's active orders for a range of securities. For each security, the bid or offer price is shown together with the price of the last amount dealt. Where an order has been matched, an indication is displayed. Thus, in the offer column for 3 year US Government treasuries a bid at 99.00 is shown as hit. To the left of the identity of the security is a +/− button which can be selected to expand (or contract) the display for that security. The expanded display shows both the bid price and the bid size and would show offer price and size if offers had been entered. In this case, there are bids for 10 mm at 99.00 and 98.00. In the lower half of the display is an order entry panel generally designated 210. This identifies the security presently selected and has windows for entry of price, size, the amount of the order that is hidden and order type (FaS, FaK etc). Bid and offer buttons 212, 214 cause bids or offers to be entered and bids and offers may be deleted through bid and offer delete buttons 216, 218.

For speed of entry, common amounts may be entered by clicking on one of the common amounts buttons 220 to select a volume of 10 mm, 25 mm, 50 mm or 100 mm or to clear the amount window. Hit and take buttons 222 and 224 enable the trade to send aggressive orders into the market.

Embodiments of the invention have the advantage that trades may be executed at a price better than the workup price by terminating the workup before its natural end and initiating a new workup at the better price. The new workup will preferably have the same characteristics in terms of length and number of phases as the original workup. This approach ensures that the market can move rapidly to the next price point when there is no further interest at the workup price point without having to wait for the workup to time out. This ensures that orders from algorithmic traders in particular are not delayed and so increases the number of orders that can be executed by the system and the responsiveness of the system in a rapidly moving market.

It will be appreciated that a workup is a continuance of the initial trade where further trades are performed at the same price. Where the trade through process described above is used, the trade is ended during workup and a new trade is initiated at the better price and a new workup initiated so that additional orders can be added at the new price until the workup times out or is replaced by a new workup at a still better price. Thus, each workup is a separate trade.

It will be appreciated that the various aspects of the invention described are applicable to the trading of a wide range of items. The trade through protocol may be used for trading any item or instrument which uses a workup protocol.

Many modifications to the system and method described above are possible and will occur to those skilled in the art without departing from the scope of the invention which is defined solely by the following claims.

The invention claimed is:

1. An electronic trading system for trading an item comprising:
    a server programmed to operate as a matching engine for matching orders to sell and orders to buy the item from plural trader terminals each in communication with the server;
    wherein the server is further programmed to:
        receive a passive order to buy or sell the item from a first trader terminal, the passive order comprising at least a price and a quantity for the item;
        receive an aggressive order to hit or lift the passive order from a second trader, the aggressive order including at least a quantity for the item;
        execute a first transaction between the first and second traders, the transaction being to buy or set an amount of the item in response to the aggressive order at the price specified in the passive order;
        initiate a first workup during which additional orders to buy and sell the item at the price specified in the passive order can be submitted by other traders trading on the system, said additional orders being executed at the price specified in the passive order;
        receive, during said first workup, at least one additional order specifying a price better than the price specified in the passive order and, where the amount of the additional order at the better price is equal to or greater than a predetermined threshold;
        terminate the workup at the passive order price;
        initiate a further workup at the better price; and
        execute an additional transaction involving the other traders at the better price specified in the additional order.

2. A system according to claim 1, wherein the server stores the threshold amount and the threshold amount is set according to the item being traded.

3. A system according to claim 1, wherein the server is programmed to aggregate orders received at the better price and to initiate the further workup when the aggregate amount of a plurality of orders at the better price is equal to or exceeds the threshold amount.

4. A system according to claim 1, wherein the server is programmed to execute the additional order at the passive order price for an amount of the additional order corresponding to orders in the trading system order book at the passive order price and to initiate said further workup and execute an additional transaction at the better price in respect of a remaining amount of the additional order if said remaining amount is equal to or exceeds the threshold amount.

5. A system according to claim 4, wherein the server is programmed to determine whether the remaining amount of an additional order equals or is greater than the threshold amount based on an aggregation of said remaining amount with further orders at the better price.

6. A system according to claim 1, wherein the additional order is a passive order comprising a visible and a hidden amount and the server is programmed to determine whether the amount of orders at the better price equals or exceeds the predetermined threshold based on the sum of the visible and hidden amounts.

7. A system according to claim 1, wherein server is programmed to initiate said further workup only when an order book for the item has an amount of passive orders and aggressive orders at the better price each equal to or greater than the threshold amount.

8. A system according to claim 7, wherein the amount of passive orders equal to or greater than the threshold amount is an aggregation of two or more passive orders.

* * * * *